Feb. 8, 1949. L. B. PICKLEY 2,461,127
COMPOSITE PHOTOGRAPHY
Filed Feb. 19, 1946
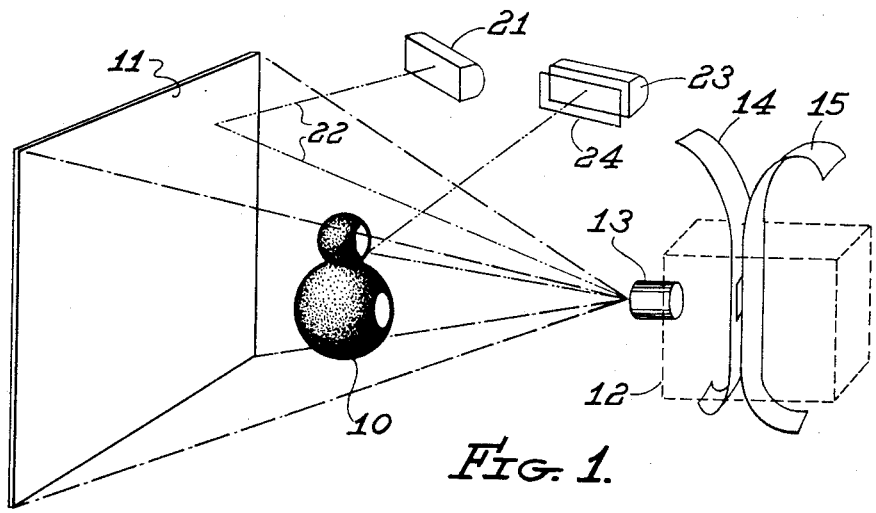
Fig. 1.
Fig. 2. 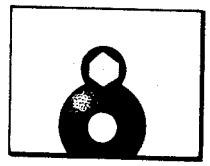  Fig. 3.
Fig. 4. 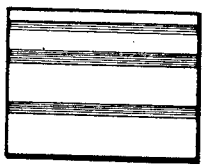  Fig. 5.

Inventor
Leonard B. Pickley
by C. R. Meeker
Attorney

Patented Feb. 8, 1949

2,461,127

UNITED STATES PATENT OFFICE 2,461,127

COMPOSITE PHOTOGRAPHY

Leonard B. Pickley, North Hollywood, Calif.

Application February 19, 1946, Serial No. 648,587

4 Claims. (Cl. 88—16)

This invention pertains to methods of photography and is particularly directed to methods and means whereby composites in full color may be readily obtained. Generally stated, the invention pertains to means and methods whereby a photographic image of any desired object may be obtained in one locality or in a studio under optimum photographic conditions and then be caused to appear in a final composite pictorial representation as being positioned within or in front of a photographic image representing any suitable or desired background. The background image may have been obtained by photographing the desired background (whether natural, a painting, or other reproduction) in a separate or different locality or as a separate or different step.

The art of composite photography has been practiced for many years and has included double printing, double exposure and similar methods. Prior methods, however, have been subject to many disadvantages, among these disadvantages being the difficulty of obtaining mattes or masks of sufficient density. Ordinarily, numerous steps involving chemical intensification, the use of duplicates or "dupes," and other expedients made it difficult to overcome the appearance of a hard edge between the background and foreground images in the composite, this giving the foreground image a cutout or artificial appearance.

In addition, prior methods require the use of two mattes (a male and a female) and introduce errors which give rise, very often, to fringing, mis-alignment, and other difficulties.

The present invention, although particularly directed to the production of composites in natural color, is also applicable to the production of composites in monochrome and is characterized by the fact that superposition of two pictures is obtained with only one mask or matte. This mask is obtained at the same time that the foreground object is photographed, and by the use of a camera capable of exposing two films simultaneously a photographic image of the foreground object and of a matte is obtained, perfect registration being thus insured. The matte or mask film obtained by the present invention needs no intensification and is thereby capable of retaining all of the gradation and softness which appears in the edges of the foreground image.

It is also to be noted that by the method of the present invention the foreground object is photographed on its original film and utilized in that condition in the projection of the finished composite so that all of the desirable qualities imparted to the photographic image of the foreground object during initial photography are retained in the composite.

Generally stated, the method of the present invention involves the use of one integral color film capable of inherently recording in color and another film preferentially sensitive to infra-red. The method also involves the use of suitable light filters, as described in greater detail hereinafter. As previously stated, however, the method is also applicable to black and white photography.

An object of the present invention, therefore, is to disclose and provide novel means and methods of composite photography.

A further object of the invention is to disclose and provide means for utilizing infra-red rays in the formation of original negatives of photographic images of objects which are to appear in and become a part of composite photographs.

These and other objects and advantages of the invention will become apparent to those skilled in the art from the following description of an exemplary procedure utilizing the methods and means of this invention, it being understood that various modifications and changes may be made from the specific example given. In order to facilitate understanding, reference will be made to the appended drawings, in which:

Fig. 1 is a schematic representation of an arrangement which may be used in photographing a foreground object to simultaneously obtain an image of the foreground object and a matte.

Figs. 2 and 3 diagrammatically represent two photographic impressions obtained during such photography.

Fig. 4 diagrammatically represents a latent color image of a suitable background.

Fig. 5 represents an intermediate stage in the production of a composite.

Figure 6:
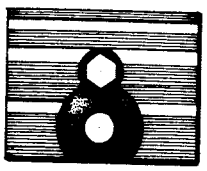
Fig. 6 is a completed composite in color obtained by the performance of the method of this invention.

As shown in Fig 1, the foreground object 10 which it is desired to photograph is positioned between a reflective background 11 and a camera 12. The object 10 may be animate or inanimate since the method of the invention is applicable to live action as well as to use with puppets, miniatures, etc. The reflective background 11 may be a white screen.

The camera 12 provided with lens 13 is preferably capable of receiving and exposing two films simultaneously. The two films may be exposed in bi-pack relation (as indicated in Fig. 1) or the camera may be provided with a beam splitter so that the two films being simultaneously exposed occupy planes at right angles to each other.

In the example described herein, the camera 12 is provided with an integral color film 14 capable of recording in natural color and with an infra-red sensitive film 15. The film 14 may be of the type ordinarily processed by reversal and such film usually carries a yellow filter between the layers of emulsion on film 14, and in many instances is provided with an antihalo backing. When this type of film is employed it is not necessary to use an additional light filter between the film 14 and the film 15 since the yellow filter and the antihalo backing act as a suitable filter for the film 15.

The reflective background screen 11 is illuminated with normal visible light from a source or sources such as 21, light rays of such normal visible light being indicated at 22. It may be noted here that no special lighting equipment is necessary in carrying out the method of the present invention since normal modern lighting equipment used in studios is rich in infra-red so that large quantities of infra-red are reflected by the background 11 into the lens of the camera 12. Normally, incandescent lamps emit light of frequencies extending through the visual spectrum and including the infra-red, reaching a high point at about 800 millimicrons.

The foreground object 10 is illuminated from any suitable light source or sources such as 23 but the light impinging upon the foreground object 10 is virtually free from infra-red, this condition being attained by the use of suitable filters such as filter 24 positioned between the light source and the foreground 1. It may be noted that the term "infra-red" may be said to refer to light having a longer wave length than about 660 or 680 millimicrons. Heat-absorbing glass acts as a suitable filter.

The two films 14 and 15 are simultaneously exposed to the foreground object 10 arranged and illuminated as described hereinabove so as to obtain two photographic impressions on the films 14 and 15, these impressions being diagrammatically illustrated in Figs. 2 and 3 respectively. It will be noted that the integral color film 14 will, upon development, carry an integrally colored image of the foreground object 10 upon a transparent background. The film 15 (sensitive to infra-red) has received visible light reflected from the background 11. As all of the infra-red is filtered from the foreground object 10 by filter 24 at the light source and all of the visible light to which this film 15 is sensitive is filtered by the yellow filter usually carried between the emulsion layers of the color film 14, the film 15 after being developed will have a virtually clear foreground area coextensive with the foreground object 10 and a virtually opaque background area, as best shown in Fig. 3.

It may be noted at this point that when the camera lens 13 is at sharp focus on the front or integral color film 14, no correction is needed for the infra-red-sensitive film 15 because the thickness of the emulsion base of film 14 gives sufficient focus adjustment for the longer infra-red rays.

A background which it is desired to use in the final composite is photographed upon a separate integral pack-type of color film as a separate operation but this background film (illustrated in Fig. 4) is not developed. Fig. 4, therefore, shows a latent image of a color background carried upon a separate film. This latent image of the background is then exposed to light through the matte of Fig. 3 and upon being so exposed the background film of Fig. 4 is developed and reversed so as to produce a full color background image (Fig. 5) having a clear, transparent area coextensive with the foreground object 10 originally carried by the film 14 (Fig. 2).

Since a density of 0.60 is sufficient for the so-called opaque portion of matte film of Fig. 3 and as this density may be attained by development to a normal gamma, all of the half tones and gradations which appear on the edges of the foreground object are maintained. When the latent background film 4 is exposed to normal light through the matte film of Fig. 3, these gradations are retained (at least in part) and the usual hard, artificial line of demarcation does not exist. This is particularly true since the foreground image is not obtained by photographing through a matte and there is no loss of edge texture. When the originally obtained, full color positive foreground image of Fig. 2 is superimposed upon the original full color background positive of Fig. 5, a complete composite, full color image of Fig. 6 is attained, the foreground and background blending naturally.

It is to be noted that each element of the composite can be photographed under ideal photographic conditions. Neither element of the finished composite is a dupe, both elements being carried by the films originally exposed to the foreground object and the separately photographed background.

In the event the method of this invention is employed in black and white photography, it is necessary to use an intervening filter between films 14 and 15, such filter being capable of filtering out substantially all visual light to which the infra-red film is sensitive. A filter of this type should also be employed over the infra-red-sensitive film when, in the taking of color photographs of a foreground object, a camera provided with a beam splitter is being used.

When the method of this invention is employed in the production of black and white or monochromatic composites, a reverse matte may be made from the silhouette of Fig. 3 and such reverse matte then used in printing a background from a separate negative upon a final positive emulsion, this printing operation being followed by another printing upon the same picture area with a combination of the negative of Fig. 2 and the matte of Fig. 3 so that the foreground object image is printed into the unexposed area of the final composite positive. Other double printing or double exposure methods well known to the art may be employed. All changes and modifications coming within the scope of the appended claims are embraced thereby.

I claim:

1. A method of composite photography comprising the steps of: positioning a desired foreground object before a white reflective background; illuminating the white reflective background with light of a spectral range extending through the visual and including the infra-red; directing a light of a spectral range extending through the visual and including the infra-red upon the foreground object, filtering out the infra-red at the foreground light source to illuminate the object with light substantially free from infra-red; simultaneously exposing an integral color recording film and an infra-red sensitive film in bi-pack arrangement to the foreground object and white reflective background so illuminated; filtering the light directed to the infra-red film through filters carried by the integral color film to reject visual light; developing and reversing the integral color recording film to obtain a color positive image of the foreground object on a virtually transparent background; developing the infra-red sensitive film to obtain a picture area having a virtually opaque background and a virtually transparent foreground co-extensive with the image of the foreground object on the integral color recording film; exposing an integral color film bearing a latent image of a desired background component to white light through the transparent portion of the developed infra-red sensitive film; processing the background film so exposed by reversal to obtain an integrally colored positive background film with a virtually transparent foreground area co-extensive with the transparent area of the infra-red film; and placing the integrally colored foreground film having a transparent background area and the integrally colored background film with a transparent foreground area in registry to form a composite.

2. In a method of composite photography, the steps of: positioning a desired foreground object before a white reflective background; illuminating the white reflective background with light of a spectral range extending through the visual and including the infra-red; directing a light of a spectral range extending through the visual and including the infra-red upon the foreground object, filtering out the infra-red at the foreground light source to illuminate the object with light substantially free from infra-red; simultaneously exposing an integral color recording film and an infra-red sensitive film in bi-pack arrangement to the foreground object and white reflective background so illuminated; filtering the light directed to the infra-red film through filters carried by the integral color film to reject visual light; developing and reversing the integral color recording film to obtain a color positive image of the foreground object on a virtually transparent background; and developing the infra-red sensitive film to obtain a picture area having a virtually opaque background and a virtually transparent foreground co-extensive with the image of the foreground object on the integral color recording film.

3. In a method of composite photography, the steps of: positioning a foreground object in front of a white reflective surface; illuminating such surface with light of a spectral range including the visual and infra-red; directing light including the visual and infra-red upon the foreground object, filtering out the infra-red from said light to illuminate the object with light substantially free from infra-red; and simultaneously exposing a color recording film and an infra-red sensitive film in bi-pack arrangement to the foreground object and white reflective background so illuminated.

4. In a method of composite photography, the steps of: simultaneously exposing an image recording film and a film sensitized to infra-red to a foreground object illuminated with light virtually free from infra-red, said object being positioned before a white reflective background illuminated with normal white light including infra-red; and filtering the light reaching the infra-red sensitive film to reject visual light and to obtain an image of the foreground object on a transparent background on one of said films and a matte having an opaque background and a virtually transparent foreground coextensive with the foreground object on the infra-red sensitive film.

LEONARD B. PICKLEY.

REFERENCES CITED

The following references are of record in the file of this patent:

UNITED STATES PATENTS

| Number | Name | Date |
|---|---|---|
| 1,610,410 | Baker | Dec. 14, 1926 |
| 1,818,354 | Pomeroy | Aug. 11, 1931 |
| 1,982,211 | Gillette | Nov. 27, 1934 |
| 2,204,049 | Pianskoy | June 11, 1940 |
| 2,297,598 | Whittaker | Sept. 29, 1942 |